United States Patent [19]

Young

[11] Patent Number: 4,545,738
[45] Date of Patent: Oct. 8, 1985

[54] LINEAR MOTOR COMPRESSOR WITH CLEARANCE SEALS AND GAS BEARINGS

[75] Inventor: Niels O. Young, Free Union, Va.

[73] Assignee: Helix Technology Corporation, Waltham, Mass.

[21] Appl. No.: 576,815

[22] Filed: Feb. 3, 1984

[51] Int. Cl.$^4$ .................... F04B 39/00; F01B 31/00
[52] U.S. Cl. .................... 417/53; 417/437; 92/DIG. 2; 92/127
[58] Field of Search ............ 92/DIG. 2, 127; 62/6; 417/437, 53

[56] References Cited

U.S. PATENT DOCUMENTS

| | | | |
|---|---|---|---|
| 2,430,764 | 11/1947 | Gabriel | 92/127 |
| 2,495,516 | 1/1950 | Foster | 92/127 |
| 3,068,960 | 12/1982 | Macks | 184/18 |
| 3,127,955 | 4/1964 | Macks | 184/18 |
| 3,142,262 | 7/1964 | Firth et al. | 92/127 |
| 3,153,987 | 10/1964 | Thoma | 92/57 |
| 3,168,013 | 2/1965 | Williamson | 92/112 |
| 4,387,567 | 6/1983 | White | 60/520 |
| 4,387,568 | 6/1983 | Dineen | 60/520 |
| 4,458,489 | 7/1984 | Walsh | 62/6 |

FOREIGN PATENT DOCUMENTS

| | | | |
|---|---|---|---|
| 1946786 | 3/1970 | Fed. Rep. of Germany | 92/DIG. 2 |
| 545805 | 4/1977 | U.S.S.R. | 92/DIG. 2 |
| 703708 | 12/1979 | U.S.S.R. | 92/DIG. 2 |

OTHER PUBLICATIONS

Mechanical Technology Incorporated Report AD 787142, 5/10/74.
Sherman, A., M. Gasser, M. Goldowsky, G. Benson and J. McCormick, "Progress on the Development of A 3- to 5-Year Lifetime Stirling Cycle Refrigerator for Space", CEC, 1979, pp. 791–800.

Primary Examiner—William L. Freeh
Attorney, Agent, or Firm—Hamilton, Brook, Smith & Reynolds

[57] ABSTRACT

A gas bearing system for a piston 24 of a linear compressor 20 in which gas from the piston head space 26 is injected into a high pressure reservoir 106 within the piston when the working fluid in the piston head space is at high pressure. In one embodiment, gas from a low pressure reservoir 104 is exhausted into it when the piston working space fluid is at low pressure. Gas flow is directed between high pressure and areas of low pressure during operation of the piston. This gas flow is directed between the piston and its surrounding sleeve 30 in a manner which holds the piston 24 in suspension away from the sleeve 30 to thereby reduce the friction and wear experienced by the piston and sleeve.

16 Claims, 12 Drawing Figures

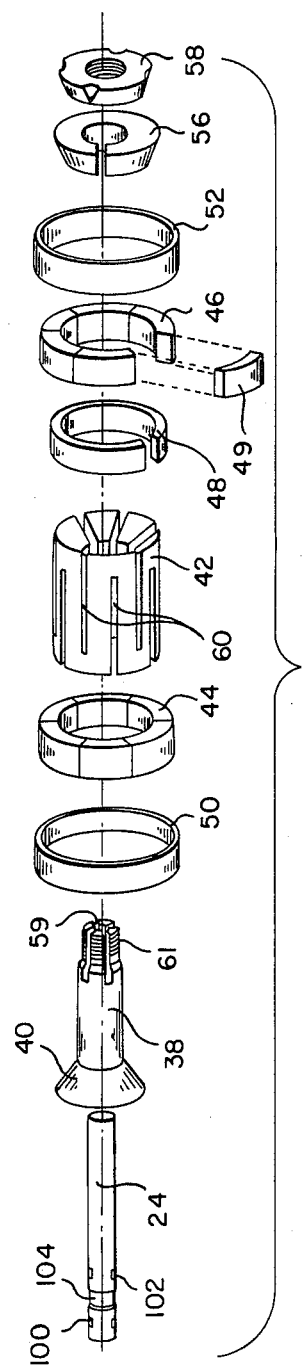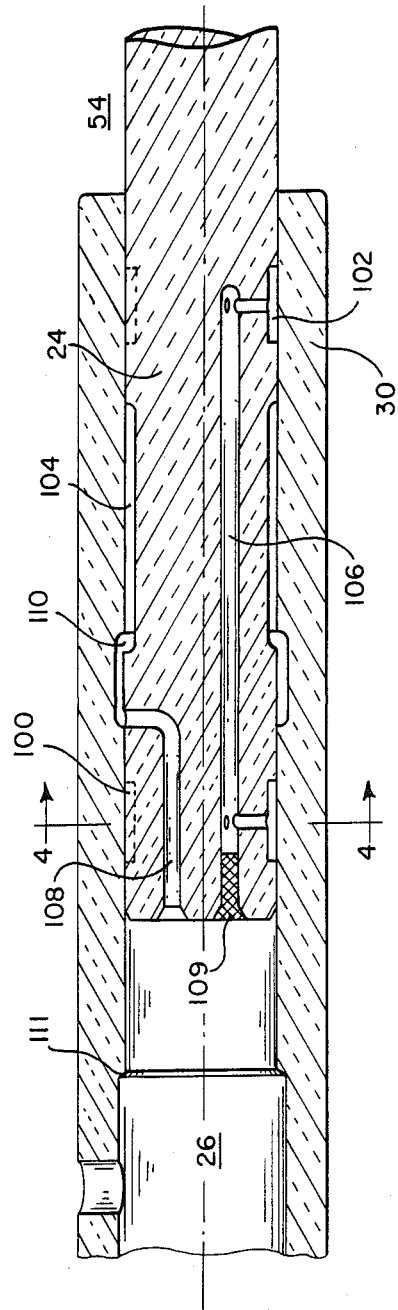

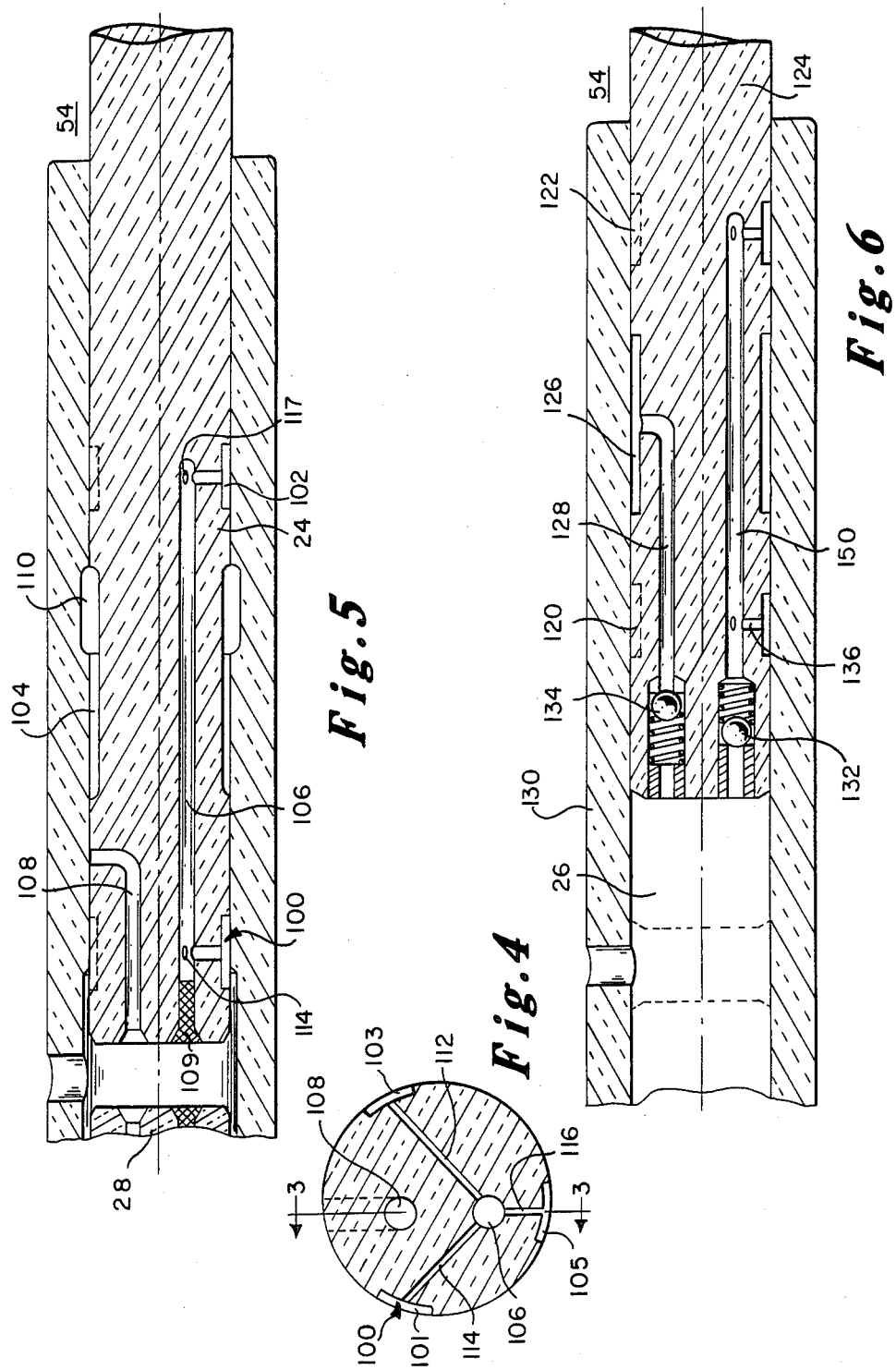

LINEAR MOTOR COMPRESSOR WITH CLEARANCE SEALS AND GAS BEARINGS

DESCRIPTION

1. Field of the Invention

This invention relates to cryogenic refrigerators such as split Stirling cryogenic refrigerators. In particular, it relates to small refrigeration systems having displacers and/or compressors driven by linear motors.

2. Background

Conventional split Stirling refrigerators usually include a reciprocating compressor and a displacer in a cold finger removed from that compressor. The piston of the compressor is mechanically driven to provide a nearly sinusoidal pressure variation in the pressurized refrigeration gas. The refrigeration gas is usually helium. This pressure variation is transmitted through a supply line to the displacer in the cold finger.

Typically, an electric motor drives the compressor through a crankshaft which is rotatably secured to the compressor. The compressing movement of the compressor causes pressure in the working volume to rise from a minimum pressure to a maximum pressure and, thus, warm the working volume of gas. Heat from the warmed gas is transferred to the environment so that the compression at the warm end of the cold finger is near isothermal. The high pressure creates a pressure differential across the displacer in the cold finger which, when retarding forces are overcome, is free to move within the cold finger. With the movement of the displacer, high pressure working gas at about ambient pressure is forced through a regenerator and into a cold space. The regenerator absorbs heat from the flowing pressurized refrigerant gas and thus reduces the temperature of the gas.

As the compressor piston reverses direction and begins to expand the volume of gas in the working space, the high pressure helium in the displacer is cooled even further. It is this cooling in the cold end of the displacer which provides refrigeration for maintaining a time average temperature gradient of over 200° Kelvin over the length of the regenerator.

At some point the decrease in pressure caused by expanding movement of the piston drops sufficiently to overcome retarding forces on the displacer in the cold finger. This causes the displacer to be returned to its starting position. Cold gas from the cold end of the cold finger is driven once again through the regenerator and extracts heat therefrom.

Recently, refrigerators have been proposed and manufactured that depend on linear motors to control the movement of the piston or pistons in the compressor, and to control movement of the displacer. The systems use clearance seals between hard ceramic pistons and cylinder liners. An example is disclosed in U.S. patent application Ser. No. 958,718, filed by Niels Young on Jan. 17, 1983.

A goal of such linear refrigerators is long life and reduced wear as must be provided for advanced aircraft and spacecraft.

DISCLOSURE OF THE INVENTION

The invention comprises a gas bearing system for a piston of a linear compressor. The linear compressor piston is positioned for axial movement within a piston housing and a high pressure gas reservoir communicates with the piston's head space when that head space contains gas at a high pressure. A low pressure gas reservoir communicates with either the piston's head space when the head space contains gas at a low pressure or a dead space volume of gas. The gas flow from the high pressure reservoir to the low pressure reservoir forms a gas bearing as it flows between the piston and piston housing inner walls or sleeve.

In one of the preferred embodiments, the high pressure gas reservoir is positioned within the piston and may further be described as comprising two sets of gas pockets. Valves or orifices are positioned in channels between the high pressure gas reservoir and the gas pockets so as to regulate the flow of gas between the reservoir and the pockets. Each set of gas pockets comprises three individual pockets which are positioned equidistant from each other about the circumference of the piston.

Also in a preferred embodiment, one set of gas pockets is positioned between the head space of the piston and a low pressure annulus. A second set is positioned between the low pressure annulus and the piston's backspace. The low pressure annulus communicates with the low pressure gas reservoir.

This gas bearing system operates by communicating a small amount of high pressure gas from the compressor working fluid volume to a high pressure reservoir when the working fluid volume is at high pressure. When the working fluid volume is at low pressure, gas is exhausted from the low pressure reservoir into the working volume. During operation of the piston, gas is fed from the high pressure gas reservoir to the low pressure gas reservoir. This gas is directed to the clearance space surrounding the piston and thereby holds the piston in suspension away from the surrounding sleeve to reduce piston friction and wear. The communication between the working space and the gas reservoir may be controlled either by check valves or by piston position.

In another preferred embodiment, gas is fed from the high pressure reservoir to channels extending axially on the piston surface. Gas flows laterally to low pressure recesses surrounding the channels to form the gas bearing. Preferably these recesses freely communicate with the piston dead volume so that they may remain at a lower pressure than the high pressure reservoir and channels. In this preferred embodiment, gas pockets are positioned at the ends of the channels as an aid to stability. Movement of the piston towards the sleeve increases flow in the affected channel to the adjacent pocket. This increased flow increases gas pocket pressure which returns the piston to its central location within the sleeve.

BRIEF DESCRIPTION OF THE DRAWINGS

The foregoing and other objects, features and advantages of the invention will be apparent from the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 is an exploded view of the armature assembly of the compressor shown in FIG. 1.

FIG. 3 is a magnified cross sectional view of a part of the piston and sleeve of FIG. 1.

FIG. 4 is a cross section of the piston taken along lines 4—4 of FIG. 3.

FIG. 5 is the same view as that shown in FIG. 3 but with the piston moved to its most forward position wherein gas is fully compressed.

FIG. 6 is a magnified cross sectional view of a piston and sleeve arrangement for a linear compressor embodying the principles of this invention in a somewhat different manner than that shown in the prior figures.

DETAILED DESCRIPTION OF THE INVENTION

Figure 1:
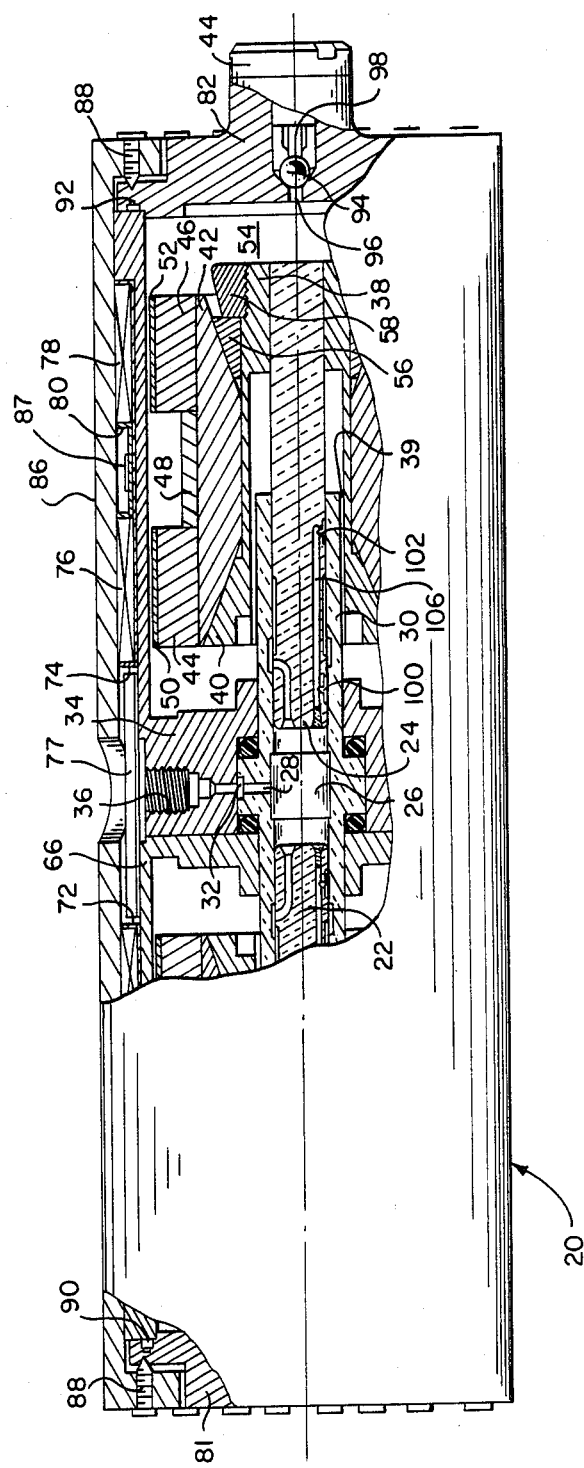
FIG. 1 is a side view of a linear compressor of a split Stirling cycle refrigerator embodying this invention, partially in section to show a linear motor assembly and refrigerant gas passages.

A preferred linear motor compressor 20 is illustrated in FIG. 1. This compressor comprises dual reciprocating piston elements 22 and 24 which when driven toward each other compress helium gas in compressor head space 26. The compressed gas then passes through a side port 28 in the compression chamber cylinder 30 to an outer annulus 32 in that cylinder. The gas from the annulus 32 passes through an outer housing 34 to a tube fitting hole 36. A tube (not shown) joined at the tube fitting hole 36 serves to deliver the gas to a cold finger of a split Stirling refrigerator in which is housed a displacer (not shown).

Preferably, pistons 22 and 24 and compression chamber 30 are of cermet, ceramic or some other hard, low friction material. The piston elements and chamber cylinder are close fitting so as to provide clearance seals therebetween. Gas bearings support the pistons in a manner which minimizes their contact with the surrounding sleeve 30. The gas bearings are discussed in detail below with reference to FIGS. 3 through 12.

The pistons 22 and 24 serve as the sole mechanical support for their respective armatures of the linear drive motors. Identical motors drive the two pistons. The right hand motor is shown in detail in FIG. 1, and its armature is shown in the exploded view of FIG. 2.

A sleeve 38 is joined to the piston 24 at its far end from the compressor head space. 26. The sleeve 38 has an inner clearance 39 such that it is free to shuttle back and forth along the compressor chamber cylinder 30 without contacting the chamber cylinder. The sleeve 38 has a tapered flange 40 at its left end. An expanding collar 42, placed on the sleeve 38 from the right, abuts the flange 40. The expanding collar 42 is an inner flux return that has a high magnetic permeability. It also supports two sets of radial magnets 44, 46 separated by a spacer 48. The six magnets 49 in each set of permanent magnets 44, 46 are retained by magnet retaining rings 50 and 52.

Although magnets 44 and 46 are shown closely packed in FIG. 2, they are preferably dimensioned such that, when placed about the expanding collar 42, spaces remain between the magnets. With that arrangement, helium gas in the dead space 54 of the compressor is free to flow between the individual magnets as the drive motor armature and compressor piston assembly shuttles back and forth.

Dissimilarities in the magnetic elements 49 may cause the magnetic axis of the group of magnets to be offset from the mechanical axis of the pistons. Such an offset of the magnetic axis from the mechanical axis would result in radial forces on the piston 24 which would tend to bind the piston within the cylinder 30. The magnetic axis can be made the same as the mechanical axis by adjusting the relative angular position of the magnets about the expanding collar 42, thus utilizing the spaces between the magnets. The elimination of radial force is particularly important where the sole mechanical support for the armature is the piston 24 within the cylinder 30. Gas bearings as discussed below would not be capable of preventing scoring of the inner surface of the cylinder 30 if the magnetic axis differed widely from that of the mechanical axis.

As shown in FIG. 2, the expanding collar 42 has slots which allow for expansion. To permanently affix the magnets 44 and 46 in position on the armature, a tapered collet 56 is wedged between the expanding collar 42 and the tapered sleeve 38 by a nut 58. As the nut 58 is tightened on the sleeve 38, the expanding collar is pressed outward by the tapered flange 40 and the collet 56. The expanding collar in turn presses the magnets 44 and 46 against the magnet retaining rings 50 and 52.

The tapered sleeve 38 has two slots, 59 and 61, formed in the end thereof so that as the collet presses outward against the expanding collar 42 it also presses inward and compresses the sleeve 38 to from a tight joint between the sleeve and the piston 24. The use of expansion and compression joints in the armature avoids the need for any epoxy or any other adhesive which might contaminate the helium gas.

The armature assembly just described is operated through the use of electromagnetic coils positioned within the housing 86 (FIG. 1). Two coils 76 and 78 are used to position piston 24. Similarly, two coils (72 and another not shown) are used to position piston 22. A spacer 80 separates the two coils. Positioned within the spacer is a Hall effect position sensor 87 which electronically determines piston position. The coils 76, 78 of the right hand armature are separated from those of the left hand armature by spacer 77. Spacer 77 is split to allow positioning of a tube fitting in hole 36.

The spacers, position sensor and coils are all arranged about the periphery of housing 34. Housing 34 and similar left hand housing 66 are sealed against end caps 82 and 81 by screws 88. These screws press the end caps 81, 82 tightly against indium seals 90 and 92 to thus tightly seal the armatures, pistons and their surrounding helium environment.

The end cap 82 includes an assembly which permits easy charging of the compressor with helium gas through port 96. Specifically, a ball 94 closes port 96 in the end cover 82. The ball is retained against the port by a retainer screw 98 and is protected from contamination by plug 44.

The armature assembly and linear motor described above is also described in detail in copending U.S. patent application Ser. No. 458,718, filed Jan. 17, 1983. When such linear motors with clearance seals are utilized for small aircraft or spacecraft refrigeration systems, it is important that they be able to operate for literally billions of cycles while unattended and it is therefore necessary that they be suitably wear-resistant. Because of the nature of linear motor helium gas-filled compressors, lubricants are to be avoided as these would contaminate the helium gas and decrease the efficiency of the refrigeration system. For these reasons, the non-contact operation provided by the gas bearings described below should be used.

FIG. 3 is a magnified cross-sectional view, which includes the mechanical axis of the piston 24 and cylinder 30 of FIG. 1. FIG. 4 is a cross section of piston 24 taken along lines 4—4 of FIG. 3. These figures show a gas compressor piston which has been suspended out of contact with the inner walls of cylinder 30 by two rings of gas-bearing pockets. A forward ring of gas pockets 100 and an aft ring of gas pockets 102 provide for even flow of gas to annulus 104. This gas flow bearing provides for even suspension of the piston 24 within the cylinder 30. Both sets of gas pockets are fed with a flow of high pressure helium gas.

Each set of pockets 100, 102 comprises three pockets spaced equidistant about the circumference of the piston. For example, as shown in FIG. 4, the pocket ring 100 comprises three pockets 101, 103 and 105.

FIG. 5 is a view of the piston and cylinder shown in FIG. 3 wherein the piston is in the position at which the helium gas in piston head space chamber 26 is most fully compressed. As can be seen in FIG. 5, highly compressed helium gas is allowed to enter into the internal conduit and reservoir 106 through pocket ring 100 by means of an increased diameter cutback 111 in the cylinder 30. The inner reservoir 106 is capped with a plug 109 to prevent continuous communication with the work volume 26. When the piston is retracted from the full forward position as shown in FIG. 3, high pressure helium gas is stored in the reservoir 106. Throughout the piston stroke, gas flows from the reservoir 106 to the pocket rings 100 and 102. Gas from the bearing pockets 100, 102 flows toward areas of lower pressure. Such lower pressure exists at the low pressure port, annulus 104; the head volume 26; and the dead space 54 when the piston is at the position shown in FIG. 3.

When the piston is in its rearmost position as shown in FIG. 3, the helium gas in the central area 26 is most fully expanded to its lowest pressure. The low pressure annulus is then exhausted of gas through the conduit 108 into piston head spacer 26. Setbacks 110 in the inner wall of cylinder 30 allow for the gas to flow through conduit 108 from the low pressure annulus 104. Throughout the remainder of the piston stroke, gas is no longer able to pass through the setbacks 110 and conduit 108, so that the annulus 104 serves as a low pressure sink.

It therefore can be seen that the gas dynamics are such that high pressure gas will normally flow from pockets 100 and 102 towards the low pressure annulus 104.

Referring now to FIG. 4, it can be seen that the gas conduit and reservoir 106 holds a much larger volume of gas than port channels 112, 114 and 116. The diameters of these channels control the flow to the gas pockets so that approximately equal amounts of gas flow to the equally spaced pockets 100. These channels also serve as a restriction such that the peak pressures provided by the intermittent opening of the reservoir 106 to the high pressure helium gas is smoothed out to produce a fairly constant flow of gas through the gas pockets. Other channels such as 117 provide high pressure gas to pocket ring 102 in a similar manner. If reservoir 106 were positioned at the center of piston 24, the three channels would be of equal length and therefore would be best constructed with equal diameters. With different lengths they are of different diameters to provide equal flow. Other methods may be used to control the flow in a manner to provide smooth consistent flow through the gas bearings. These can include valves or orifices positioned within channels 112, 114 and 116.

High pressure gas in pockets 100 and 102 generally flows through the very small clearance space between the piston 24 and cylinder 30 towards annulus 104. During compressor operation, however, some high pressure gas may also flow toward the compressor dead space 54 and head space 26. Gas pressure in dead space 54 is normally higher than that in annulus 104; however, it is still at a lower pressure than the gas pockets 102. Therefore, some gas may escape to the backspace and aid in suspending the central section of the piston away from the cylinder walls. Gas also flows from gas pockets 100 towards head space 26; however, at parts of the cycle where the working fluid in the head space is highly compressed flow from the pockets is interrupted. It is at this point in the compressor's cycle that the low pressure central annulus 104 is most important, for without the continued gas flow from pockets 100 to the annulus 104, the forward section of the piston would tend to contact the inner walls of the cylinder 30. Such contact would cause wear that might eventually effect compressor operation.

FIG. 6 illustrates another embodiment of selfcharging gas pocket bearings. In this embodiment, check valves 132 and 134 serve to control the charging of gas fluid reservoirs 128 and 150 and thereby control the pressures in the high pressure gas pockets and the low pressure annulus.

High pressure gas pocket rings 120 and 122 are positioned at the forward end and central section of piston 124, thus they support the piston in a manner which suspends its out of contact with the inner walls of cylinder 130. As discussed above, high pressure helium gas flows from high pressure pocket rings 120, 122 to the low pressure annulus 126. In this embodiment, however, the gas flow to the reservoirs is selectively controlled through the preset check valves 132 and 134.

When the helium gas in work space 26 is fully expanded to its lowest pressure during the compressor cycle, check valve 134 allows gas to escape from reservoir 128, thus exhausting annulus 126. Conversely, when the helium gas in work space 26 is most fully compressed, check valve 132 opens and allows for recharging of reservoir 150 with the high pressure sure gas. At all other times, the check valves remain closed thereby sealing reservoirs 128 and 150 from the helium gas working volume 26. Conduits such as conduit 136 are the correct diameter to restrict the gas flow from the reservoirs in a manner that smooths the gas flow to the gas pocket rings 120, 122 so that the bearings operate continuously.

Small compressor machines such as that described herein operate at high frequencies and therefore it is desirable to have the check valves as close to the source of oscillating pressure as is possible. The reasons are that if the check valves are distanced from the compression space, the compressor dead volume is increased and the range of pressure experienced by the check valve is compromised by intermediate conduits. Either of these two events would ultimately compromise compressor and gas bearing efficiency.

Gas therefore flows to the bearings in much the same manner as that discussed above in the first embodiment. Gas from the high pressure pockets flows towards areas of low pressure. During most of the compressor cycle, gas flows from high pressure pockets 120 and 122 toward low pressure annulus 126, piston head space 26 and the back space 54. The flow of gas thereby provides gas bearings to keep the piston 124 suspended away from the inner walls of cylinder 130.

When gas in volume 26 is most fully compressed, high pressure gas from pockets 120 will not tend to flow towards the working volume 26. Thus, if the use of low pressure annulus 126 in this embodiment, as annulus 104 in the first embodiment, were not provided, the piston at full compression would tend to bottom and possibly scrape against the inner walls of the cylinder 130. Thus the low pressure annulus prevents dead ending of the flow from the high pressure pockets.

In addition to serving as a bearing system which prevents wear on the piston and cylinder walls, this system also acts to prevent contamination of the helium working volume. Helium gas from rear motor chamber 54 is never allowed to enter into the working volume directly because the pockets 102, 122 are always at a higher pressure than the backspace. Flow between the pockets 102, 122 and the backspace is thus always toward the backspace. Therefore, if the backspace or motor chamber helium is contaminated, it will not penetrate upstream of the piston because of the overall flow characteristcs from the gas bearing pockets. Helium gas lost from the bearing system into the crankcase or dead space 54 can be returned to the working volume through a filter which removes contamination. Alternatively the dead space can be allowed to remain at a higher pressure relative to the head space.

FIG. 7 through 12 discloses another embodiment of a self-charging gas bearing for the piston of a linear motor system. In this embodiment, multiple low pressure recesses on the circumferential surface of the piston 152 direct gas flow from a high pressure reservoir to form the gas bearing.

Figures 7, 8:
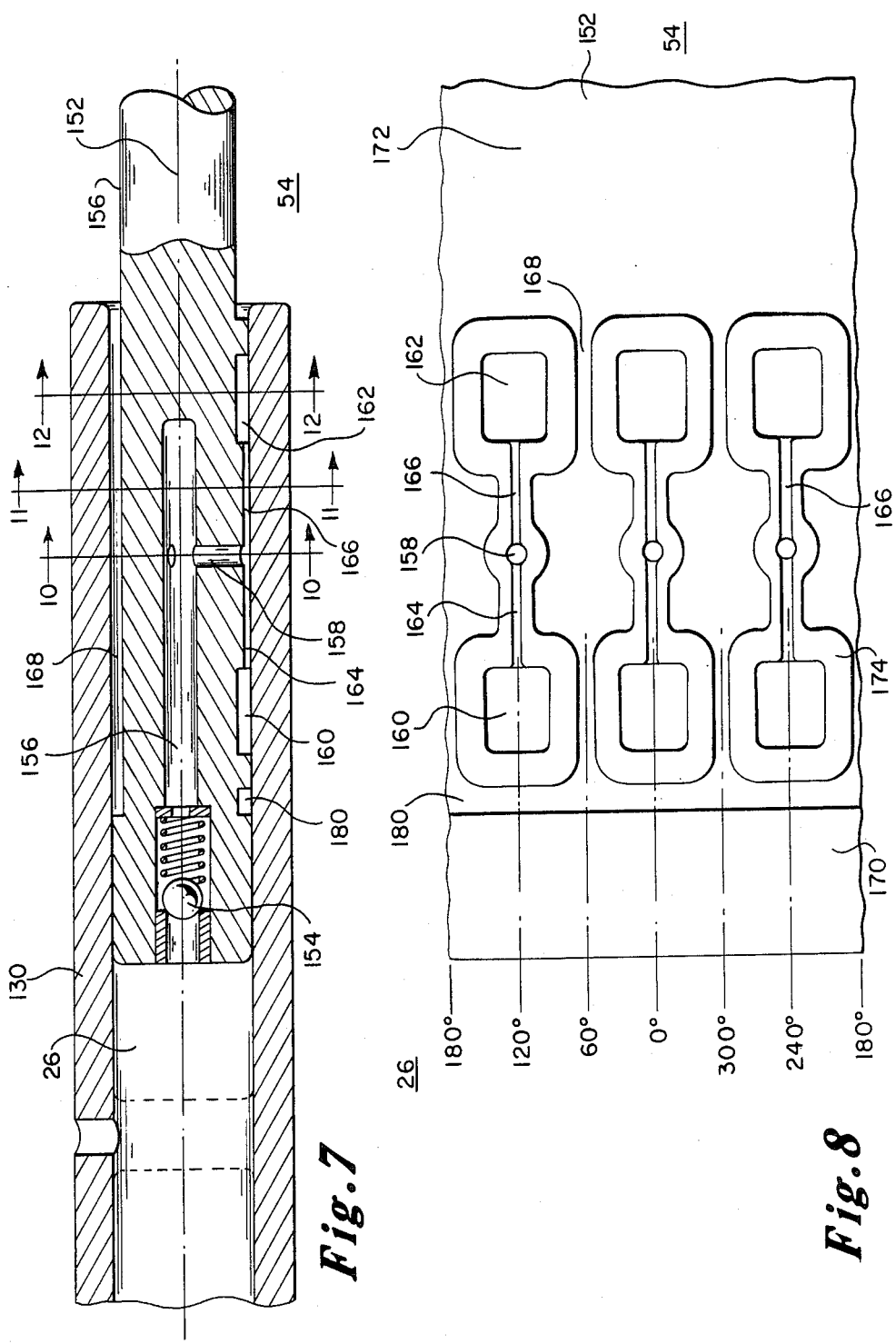
FIG. 7 is a magnified cross section of a piston and cylinder portion of a linear compressor embodying the principles of this invention in a manner which utilizes the compressor dead space gas volume.
FIG. 8 is an unwrapped view of the piston of FIG. 7 disclosing low pressure recesses on the piston surface.
Figure 10:
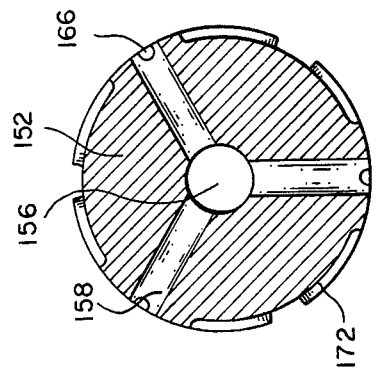
FIG. 10 is a cross section of the piston of FIGS. 7 and 8 taken along lines 10—10 of FIG. 7 showing a high pressure reservoir and channels.
Figure 12:
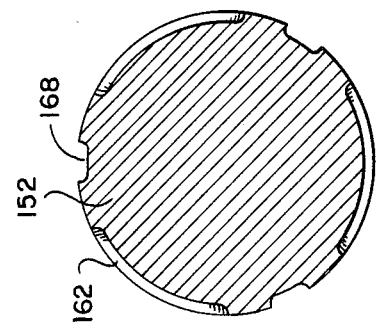
FIG. 12 is a cross section of the piston taken along lines 12—12 of FIG. 7 displaying gas pockets.
Figure 11:
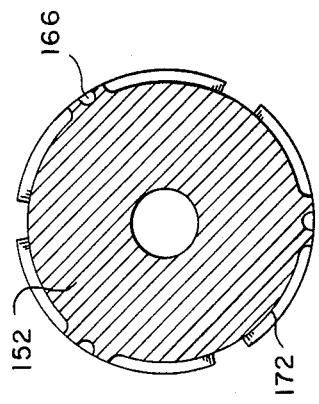
FIG. 11 is a cross section of the piston taken along lines 11—11 of FIG. 7 showing the low pressure recesses and high pressure channels at a different axial location than FIG. 10.

FIG. 7 is a magnified cross sectional view of the piston illustrating this embodiment. FIGS. 10 through 12 are cross sections of the cylinder disclosed in FIG. 7. These axial cross sections whould be viewed in conjunction with FIG. 7. A centrally located check valve 154 is used to control gas flow so that reservoir 156 is charged with high pressure gas from head volume 26. Check valve 154 is normally closed but opens to allow gas flow to the reservoir when the helium gas in head volume 26 is at its peak pressure. Storage volume reservoir 156 delivers pressurized gas through ports 158 to channels 164 and 166.

Figure 9:
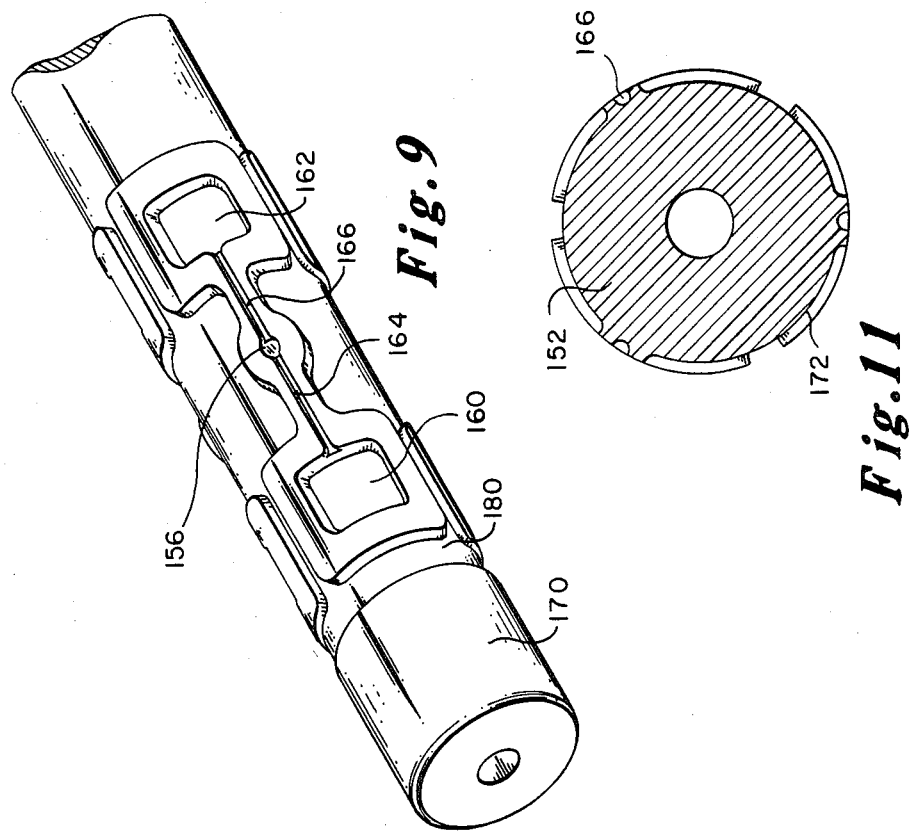
FIG. 9 is an perspective view of the piston of FIGS. 7 and 8.

High pressure channels 164, 166 are more readily seen in the perspective view of the piston shown in FIG. 9 and the unwrapped view of FIG. 8. Channels 164 and 166 extend axially on the piston and communicate with forward and aft pocket rings 160 and 162 respectively. As shown in FIG. 8, an extensive area of the piston surface is recessed and allowed to freely communicate with dead space volume 54. These low pressure recesses 172, 168, 180 receive the gas flow from high pressure channels 164 and 166 and pockets 160 and 162.

The cylindrical piston surface is made up of four levels or sections. The section with the largest diameter is found adjacent to head space 26. This high diameter area 170 maintains the lowest clearance with the cylinder 130 and serves as a clearance seal so that relatively small amounts of gas leak from head space 26 past section 170. Recesses 168, 172, 180 are the area of smallest diameter on the piston. These recesses allow for communication of large areas of the piston with the dead space 54 which remains at a relatively stable pressure which is about the average of the head space pressure. This fluid communication with the dead space reduces the gas pressure in the recesses. Plateaus 174 surround the high pressure pockets and channels to provide separation between high and low pressure areas and direct the flow of the gas bearing. The channels 164 and 166 are at a slightly larger diameter than the gas pockets 160 and 162 which are at the same reduced diameter as low pressure area 172. This complex cylindrical surface is manufactured by etching or grit blasting a cylinder through masks which is far easier than manufacturing pockets on an internal surface. Alternatively, however, the cylinder inner wall could be shaped to form the recesses and channels if use of the cylinder surface is unavailable.

The various diameters of the piston surface are suited to properly direct the flow of the gas bearing so that the piston will not contact the cylinder. The system as shown also maintains a high degree of stability. Normally, gas leaks from channels 164 and 166 laterally to the low pressure recesses surrounding them. Channels 164 and 166 are sufficiently small so that the flow therethrough is significantly affected by changes in lateral leakage. If the piston moves closer to its surrounding cylinder 130 near a particular channel, lateral leakage from that channel declines. When this occurs, more high pressure gas is delivered to the pockets 160 and 162. The result of increased flow to the pockets is to increase gas pocket pressure which results in the piston being moved farther away from the cylinder wall. The system thereby tends to stabilize the piston's operating clearance by automatically counteracting off center piston movement. As a result of this gas flow, all three pockets of each pocket ring remain at substantially the same clearance distance from the cylinder walls, or sleeve, at all times.

A further advantage of exterior channels 164 and 166 is that they are less likely to clog than small flow restricting holes. The channels tend to remain open due to the relative movement of the piston and cylinder.

In this embodiment storage volume pressure is always elevated above that of the dead space pressure 54. The storage volume pressure in reservoir 156 remains essentially constant as it is intermittently recharged from the head space 26. Since storage reservoir pressure remains essentially constant, the piston is always maintained free of contact with its mating cylinder 130.

In many compressors minimum working space pressure is lower than gas pressure in the dead space 54. Therefore, the dead space may be used as a source of relatively high pressure gas and the central storage volume exhausted to the working space 26. Gas flow can still be directed to form gas bearings in the same manner as discussed above.

A gas bearing system has therefore been shown which permits construction of a helium compressor for which no maintenance is required for a long period. This long life is provided by the reduction of contact between the moving parts. If little or no contact is achieved, such parts will experience little or no wear. Incorporation of a fluid reservoir within the piston provides for a very compact gas bearing system. Further, the embodiments shown are relatively inexpensive to manufacture and easily adaptable to the miniature compressors used on aircraft and spacecraft.

While the invention has been particularly shown and described with reference to preferred embodiments thereof, it will be understood by those skilled in the art that various changes in the form and detail may be made without departing from the spirit and scope of the invention as described in the appended claims. For example, the gas bearing has application beyond compressors. A similar gas bearing could be used on the drive piston of a refrigerator displacer.

I claim:

1. A reciprocating piston assembly comprising:
    a piston positioned for axial movement within a sleeve with a working volume of gas at one end thereof;
    a gas storage reservoir positioned within said piston;
    a cutback in the surface of the sleeve which provides fluid communication between the working volume of gas and the gas storage reservoir only when the piston is at one end of its stoke;
    a recess on the circumferential surface of said piston in fluid communication with a second reservoir of gas; and
    a gas bearing formed between the piston and the sleeve by gas flow between the recess and the gas storage reservoir.

2. The reciprocating piston of claim 1 wherein the gas storage reservoir further comprises axial channels positioned on the circumferential surface of the piston which allow gas to flow laterally to the recess to form the gas bearings.

3. A reciprocating piston assembly comprising:
    a. a piston positioned for axial movement within a sleeve with a working volume of gas at one end thereof;
    b. a high pressure gas reservoir positioned within said piston in fluid communication with said working volume through a cutback in the sleeve only when the piston is positioned such that the working volume is at a high pressure;
    c. a low pressure gas reservoir in fluid communication with said working volume through a cutback in the sleeve only when the piston is positioned such that the working volume contains gas at a low pressure; and
    d. a gas bearing between the piston and the sleeve formed by gas flow from said high pressure reservoir to said low pressure reservoir between the piston and the sleeve.

4. A reciprocating piston as claimed in claim 3 wherein said low pressure fluid reservoir is positioned within said piston.

5. The reciprocating piston of claim 3 wherein said high pressure gas reservoir further comprises two sets of gas outlet pockets, one set positioned between the head space and a low pressure annulus and a second set positioned between the low pressure annulus and said piston's dead space and wherein said low pressure annulus is in fluid communication with said low pressure gas reservoir.

6. A compressor comprising a piston in a sleeve for compressing and expanding refrigerant gas in a work space at one end of the piston, and drive means for causing the piston to reciprocate in the sleeve, the piston having a gas bearing comprising:
    a high pressure gas reservoir positioned within said piston in fluid communication with said compressor work space through a cutback in the sleeve only when the piston is positioned such that such work space is at a high pressure, the high pressure gas reservoir being in communication with a clearance space between the piston and sleeve; and
    a low pressure reservoir in fluid communication with the clearance space between the piston and cylinder.

7. The compressor of claim 6 wherein said low pressure reservoir further comprises a recess postioned upon said piston's circumferential surface.

8. A compressor of claim 10 wherein said gas pockets are spaced equidistant from each other about the circumference of said piston.

9. The compressor of claim 6 further comprising gas bearing pockets connected to said high pressure reservoir.

10. The compressor of claim 9 further comprising gas restriction means positioned between of said high pressure reservoir and said gas bearing pockets in order to equalize gas flow between the high pressure reservoir and each pocket.

11. A method of holding a compressor piston in suspension away from the inner wall of a piston sleeve comprising the steps of:
    communicating a volume of high pressure gas from a compressor working fluid volume to a high pressure gas reservoir within said piston through a cutback in the surface of the sleeve only when the piston is positioned such that said working fluid volume is at high pressure;
    exhausting a volume of gas from a low pressure gas reservoir to a low pressure volume;
    feeding gas from said high pressure gas reservoir to a high pressure gas port;
    exhausting gas from a low pressure port to said low pressure gas reservoir; and
    directing gas through the clearance space surrounding said piston from said high pressure port to said low pressure port.

12. A reciprocating piston comprising:
    a. a piston positioned for axial movement within a sleeve with a working volume at one end thereof;
    b. a gas storage reservoir in fluid communication with said working volume when said piston is at one end of its stroke;
    c. at least two substantially axial channels positioned on a circumferential surface at the interface of said piston and sleeve in fluid communication with said gas storage reservoir;
    d. a recess on the circumferential surface at the interface of said piston and sleeve in fluid communication with a second reservoir of gas; and e. a gas bearing formed between the piston and the sleeve by lateral gas flow between the recess and the channels.

13. A reciprocating piston as claimed in claim 12 further comprising gas pockets on the surface of the piston in fluid communication with said axial channels which in combination with said channels stabilize piston position in said sleeve.

14. A method of producing a stabilized gas bearing between a piston and piston housing comprising the steps of:
 a. communicating a volume of gas from a piston working gas volume to a gas storage reservoir when said piston is at one end of its stroke;
 b. exhausting a volume of gas from recesses on the circumferential surface of said piston into a non-working volume of gas;
 c. feeding gas from said gas storage reservoir to axial channels on the surface of said piston; and
 d. directing gas laterally from said axial channels to said recess to form a gas bearing about said piston.

15. The method of producing a stabilized gas bearing between a piston and a piston housing as recited in claim 4 further comprising the step of increasing gas flow through the axial channels when such channels are closest to the sleeve and directing that increased flow to pockets positioned at the end of said channels which results in arresting the movement of the piston towards the piston housing.

16. A compressor comprising a piston in a sleeve for compressing and expanding gas in a work space at one end of the piston and drive means for causing the piston to reciprocate in the sleeve, the piston having a gas bearing comprising:
 a first gas bearing recess in the piston;
 a cutback in the sleeve which communicates with the first gas bearing recess and with the compressor work space at only one end of piston stroke to set the pressure of the gas bearing recess at about the pressure of the work space at that end of piston stroke; and
 a second gas bearing recess at a pressure other than that of the first gas bearing recess such that gas flows between the first and second gas bearing recesses in a clearance between the piston and sleeve throughout piston stroke.

* * * * *

UNITED STATES PATENT AND TRADEMARK OFFICE
CERTIFICATE OF CORRECTION

PATENT NO. : 4,545,738
DATED      : October 8, 1985
INVENTOR(S) : Niels O. Young It is certified that error appears in the above-identified patent and that said Letters Patent is hereby corrected as shown below:

On the title page, Column 2, "16 Claims" should read --12 Claims--.

Cancel Claims 12 through 15.

Signed and Sealed this

Twenty-fifth Day of March 1986

[SEAL]

Attest:

DONALD J. QUIGG

*Attesting Officer*          *Commissioner of Patents and Trademarks*